Patented Nov. 15, 1938

2,137,155

UNITED STATES PATENT OFFICE 2,137,155

PRODUCTION OF FIBROUS MATERIAL COMPOUNDS

Hermann Burmeister, Berlin-Spandau, Germany, assignor to General Electric Company, a corporation of New York No Drawing. Application November 10, 1936, Serial No. 110,181. In Germany November 15, 1935

2 Claims. (Cl. 92—21)

The invention deals with the production of fibrous-material compounds, which are particularly suitable for hard papers and which are to be made on paper machines.

It is known to make pressable compounds of phenol-formaldehyde resins with fibrous materials, in such a way that resin powder is mixed in a mixing device with a watery fibrous pulp, and that this mixture is made into solid compounds. The resin then lies between the fibers in a sandy or grainy form. Such a compound is made homogeneous in the pressing process.

The so-called hard papers are, in general, produced in such a way that the finished paper tracks are provided with a coating of varnish the resin percentage of which must be high, particularly when the hard papers shall have a low capacity for absorbing water. The disadvantage of the fibrous materials treated with resin solutions, or of tracks of fibrous material for further preparation, lies in the fact that it is extremely difficult to remove the solvent from the fibrous-material compounds which are coated with varnish. As a result the electrical properties of the final product are detrimentally affected.

It has been found that a paper which at the beginning is not coated with a resinous film but which contains the resin in a very fine division, that is, in a finely divided or granular state, between the fibers, and which is further treated according to the invention, has, after the pressing operation, that is, after conversion of the resin in place under heat and pressure to a hard and infusible state, a considerably more uniform structure than material which is manufactured in the known manner. In compounds made by first forming an intimate and uniform association of finely divided, solid, heat-curable, synthetic binder resin with moist fibrous material such, for instance, as cellulosic fibers, it is possible to remove the moisture from the fibers even at low temperatures, since there is no resinous film enclosing the fibers and the moisture; on the contrary, an unobstructed outlet for the moisture from the compound is afforded by the resin particles which are not connected together. However, in order to be able to prepare the compounds with the lowest possible pressure, and furthermore in order to have the assurance of a uniform impregnation, it is desirable to have a structure of fibrous material which contains the resin and the fibers in a closely connected manner. This is preferably obtained in such a way that the drying of the compounds takes place as long as the resin which lies between the fibers has a finely divided or granular form, while a melting of the resin located between the fibers takes place only after the moisture has been driven out, although it is carried out in the same general operating process.

The process may be carried out in a continuous operation. For example, the drying of the paper tracks until they are practically free from water may be effected on the drying rollers of a paper machine. This is then followed on the last roller, which may be heated to a higher degree, by the melting of the finely divided resin. Since the fibrous compound readily surrenders the water, the first rollers of the installation can be heated in such a way that the traveling paper track does not assume temperatures which are close to the melting point of the resin, while the last roller is heated to such an extent that the resin in the paper will be melted. In this manner, paper tracks are obtained which are free from water or moisture and which are uniformly impregnated with resin.

The melting process can also be carried out at a point removed spatially from the rollers, for instance, by letting the paper track pass through a heated shaft arranged ahead of the rollers. The speed of the machine is adjusted in such a way that a hardening of the resin does not take place. In other words, in accordance with this invention, starting material of the kind hereinbefore described is initially heated at a temperature and for a period of time sufficient to remove practically all the moisture but insufficient to melt the resin and then (advantageously immediately thereafter) the moisture-free material is heated at a temperature and for a period of time sufficient to melt the resin but insufficient to convert the resin to a hard infusible state.

The resins suitable for this manufacturing process are preferably selected in such a way that a temperature interval, which is as large as possible, lies between the melting point and the beginning of the hardening. For instance, it will be possible to use without difficulty, in the previously described manner, a resin which has a melting point of 50° C., while the hardening begins at 120° C.

It is possible to produce in this manner pressing compounds and fiber tracks by using phenol resins, cresol resins, urea-aniline resins and similar synthetic resins. When, for instance, pressing compounds are produced, it is possible to run paper tracks of great thickness. Finally, if pressing compounds in the shape of paper or cardboard are not desired, it is possible to remove the materials, by means of suitable stripping devices, from the round screening machines prior to drying in the shape of bulk fiber compounds. These unconnected masses can then be dried in the drying machine and can be made homogeneous by subjecting to heat melt the resin. It is, of course, also possible to make them more highly homogeneous by means of calendering devices.

What I claim as new and desire to secure by Letters Patent of the United States is:

1. The method of making an impregnated and coated fibrous material which consists in forming an intimate and uniform association of moist fibrous material and a binder consisting of finely-divided, solid, heat-curable synthetic resin having a melting point of at least 50° C. and an initial hardening point at least 70° C. above its melting point, subjecting the resulting composition to a heat treatment sufficient to remove practically all the moisture therefrom but insufficient to melt said resin, subjecting the practically moisture-free composition to a heat treatment sufficient to melt said resin but insufficient to convert it to a hard infusible state, and then hardening the melted resin in place under heat and pressure.

2. The method of making a hard finished paper which consists in forming a moist sheet comprising an intimate and uniform association of water, fibrous cellulosic material and a binder consisting of finely-divided, solid, heat-curable synthetic resin having a melting point of 50° C. and an initial hardening point of 120° C., heating said sheet at a temperature and for a period of time sufficient to remove practically all the water therefrom but insufficient to melt said resin, then heating the practically water-free sheet at a temperature and for a period of time sufficient to melt said resin but insufficient to convert it to a hard and infusible state, and then converting the melted resin in place, under heat and pressure, to a hard and infusible state.

HERMANN BURMEISTER.

CERTIFICATE OF CORRECTION.

Patent No. 2,137,155.                      November 15, 1938.

HERMANN BURMEISTER.

It is hereby certified that error appears in the printed specification of the above numbered patent requiring correction as follows: Page 2, first column, line 8, before the word "melt" insert to; and that the said Letters Patent should be read with this correction therein that the same may conform to the record of the case in the Patent Office.

Signed and sealed this 27th day of December, A. D. 1938.

(Seal)                                     Henry Van Arsdale
                                             Acting Commissioner of Patents.

ing compounds in the shape of paper or cardboard are not desired, it is possible to remove the materials, by means of suitable stripping devices, from the round screening machines prior to drying in the shape of bulk fiber compounds. These unconnected masses can then be dried in the drying machine and can be made homogeneous by subjecting to heat melt the resin. It is, of course, also possible to make them more highly homogeneous by means of calendering devices.

What I claim as new and desire to secure by Letters Patent of the United States is:

1. The method of making an impregnated and coated fibrous material which consists in forming an intimate and uniform association of moist fibrous material and a binder consisting of finely-divided, solid, heat-curable synthetic resin having a melting point of at least 50° C. and an initial hardening point at least 70° C. above its melting point, subjecting the resulting composition to a heat treatment sufficient to remove practically all the moisture therefrom but insufficient to melt said resin, subjecting the practically moisture-free composition to a heat treatment sufficient to melt said resin but insufficient to convert it to a hard infusible state, and then hardening the melted resin in place under heat and pressure.

2. The method of making a hard finished paper which consists in forming a moist sheet comprising an intimate and uniform association of water, fibrous cellulosic material and a binder consisting of finely-divided, solid, heat-curable synthetic resin having a melting point of 50° C. and an initial hardening point of 120° C., heating said sheet at a temperature and for a period of time sufficient to remove practically all the water therefrom but insufficient to melt said resin, then heating the practically water-free sheet at a temperature and for a period of time sufficient to melt said resin but insufficient to convert it to a hard and infusible state, and then converting the melted resin in place, under heat and pressure, to a hard and infusible state.

HERMANN BURMEISTER.

---

CERTIFICATE OF CORRECTION.

Patent No. 2,137,155. November 15, 1938.

HERMANN BURMEISTER.

It is hereby certified that error appears in the printed specification of the above numbered patent requiring correction as follows: Page 2, first column, line 8, before the word "melt" insert to; and that the said Letters Patent should be read with this correction therein that the same may conform to the record of the case in the Patent Office.

Signed and sealed this 27th day of December, A. D. 1938.

(Seal)

Henry Van Arsdale
Acting Commissioner of Patents.